(12) United States Patent
McCaffrey et al.

(10) Patent No.: US 7,660,726 B2
(45) Date of Patent: Feb. 9, 2010

(54) SYSTEM AND METHOD FOR REQUESTING, RECEIVING, TRACKING AND VERIFYING OR RECEIVING PROOF OF INSURANCE COVERAGE AND TRANSFERRING RISK TO UNINSURED OR UNDERINSURED PARTIES

(75) Inventors: Thomas McCaffrey, San Clemente, CA (US); Adam Berkman, Armonk, NY (US); Robert Samborn, Santa Monica, CA (US); Catherine Rosczewski, Burbank, CA (US); Scott Kaplan, Los Angeles, CA (US)

(73) Assignee: Accruent, Inc., Santa Monica, CA (US)

( * ) Notice: Subject to any disclaimer, the term of this patent is extended or adjusted under 35 U.S.C. 154(b) by 898 days.

(21) Appl. No.: 10/317,645

(22) Filed: Dec. 11, 2002

(65) Prior Publication Data
US 2004/0078246 A1 Apr. 22, 2004

Related U.S. Application Data

(60) Provisional application No. 60/340,630, filed on Dec. 11, 2001.

(51) Int. Cl.
*G06Q 99/00* (2006.01)
(52) U.S. Cl. ....................................................... 705/4
(58) Field of Classification Search ................ 705/2–4, 705/35–40
See application file for complete search history.

(56) References Cited

U.S. PATENT DOCUMENTS

| 6,272,472 | B1 * | 8/2001 | Danneels et al. | 705/27 |
| 6,526,386 | B1 * | 2/2003 | Chapman et al. | 705/4 |
| 2002/0022976 | A1 * | 2/2002 | Hartigan | 705/4 |

* cited by examiner

*Primary Examiner*—Thu-Thao Havan
*Assistant Examiner*—Thomas M Hammond, III
(74) *Attorney, Agent, or Firm*—Townsend and Townsend and Crew, LLP

(57) ABSTRACT

Disclosed is a system and method for an Indemnitee to verify insurance coverage of an Indemnitor, including the steps of at least two parties entering into a contractual relationship that obligates the Indemnitor to indemnify the Indemnitee by maintaining contractually required insurance and to provide proof of the insurance, entering the contractual insurance requirements and related pertinent information into a database, requesting on behalf of the Indemnitee proof of insurance from the Indemnitor, a service provider or the Indemnitee receiving the Indemnitor's insurance coverage information, comparing the Indemnitor's insurance coverage information with the contractual insurance requirements, determining if the Indemnitor is in contractual compliance, and issuing insurance to protect the interests of the Indemnitee in the event the Indemnitor is not in contractual compliance.

28 Claims, 12 Drawing Sheets

Coverage - Contract Insurance Requirements
General Liability

Account Name: MacDonald Construction
Type: Contract Requirement

Options: Contract Options...
Version: Original

Section: Coverage [Go] [print summary] [save]

| Insurance Type | Each Occurrence | Aggregate Limit |
|---|---|---|
| General Liability | $2,000,000 | $2,000,000 |
| Workers Compensation | $1,000,000 | $1,000,000 |
| Automobile Liability | $1,000,000 | $1,000,000 |

[save] [copy] [new] [print]

Insurance Type: General Liability

Currency Measures: United States (Dollar)

Type Detail
○ Occurrence
○ Claims Made

Claims Made Retro Date: [___] (mm/dd/yy)

Limits
General Aggregate: $2,000,000
Each Occurrence: $1,000,000
Fire Damage: $300,000
Med Expense: $10,000
Personal & Adv. Injury: $1,000,000
Products Comp/Op Agg: $2,000,000

[United States (Dollars)] help

Endorsements
☐ Additional Insured
☐ Primary Coverage
☐ Non-Contributory
☐ Cancellation by Us (cancellation notification)
☐ Waiver of Subrogation
☐ Product Liability
☐ Liquor Liability
☐ Cross Liability / Severability of Interest
☐ Fire and Water Legal Liability
☐ Warehouser's Legal Liability
☐ XCU (Explosion Collapse and Underground Damage)

FIG. 6

RISK MITIGATION NETWORK

Contract Options...

Original help

Section: Reports ▼ Go ▲ print

Report Name: Billing Detail ▼    Insured Type: Tenant ▼

- ● All Dates
- ○ From
- ○ To

List
- ● All Accounts
- ○ Specific Accounts
- ○ Multiple Accounts

Add

Display By
- ● Initiated Party
- ○ Contracted Party
- ○ Account Manager

Sort
- ● Ascending
- ○ Descending

Period 07/01/2001 to 08/01/2001

BILLING DETAIL

▲ print

| Contracted Party | Initiating Party | Contract Name | Insured Type | Description | Class Code | Forced PI, Rate | Calculation Basis | Estimated Premium |
|---|---|---|---|---|---|---|---|---|
| MacDonald Construction | XZY Landlord | 123 Main St, Burbank, CA | Tenant | Corp Office of General Contractor | 11111 | $0.042 | 10,000 SF | $420 |

* premium does not include any tax or surcharge that may be applicable.

FIG. 8

Insurance Documentation - Message [Rich Text]

File  Edit  View  Insert  Format  Tools  Actions  Help

Send

To...: Tenant

Cc...:

Subject: Insurance Documentation

Dear Tenant,

At this time, the insurance documentation currently on file from your organization is not adequate to ensure total compliance with the insurance provisions of your lease. It is essential that the following documents be received within 30 days from the date of this notification.

Certificate of Insurance
    General Liability Endorsements

We have automated the process to request these documents from your Insurance Agent. This service is provided to assist you, and is free of charge. If you have Internet access, you just click here to use the service online: www.mycinsurancecerts.com. If you do not have Internet access, you just fax this notice to us at 800 xxx-xxxx with the attached cover sheet completed and we will notify your Agent directly to obtain the documents.

Should the documents not be received within 30 days, we will purchase the appropriate coverage on your behalf and you will be charged back.

We appreciate your prompt attention to this important issue. If you have any questions regarding this matter, please contact your property manager directly.

FIG. 9

| To... | Insurance Agent |
| Cc... | |
| Subject: | Insurance Certificate Request |

Dear Agent,

Your client MacDonald Construction is using our on-line service to request verification of insurance coverage as required in its contract. This contract also requires submittal of copies of the endorsements listed below. You can provide the verification by the following methods:

1. Use our online Broker Exchange to enter the insurance information directly into your client's account. The Exchange provides your client with fast contract compliancy and easy access to his insurance information. For more detailed Exchange information or to enter the insurance information directly, just open your Internet browser and enter the following address: www.mycontracts.com or send an email to: mycontracts.rmn@mycontracts.com 2. Fax an Insurance certificate to (800) xxx-xxxx 3. Fax Endorsement copies to (800) xxx-xxxx The contract requires proof of the following Insurance Coverage:

General Liability
Limit $1,000,000
Per Occurrence

Endorsements
Primary
Non-Contributory
Cancellation 30 days
Waiver of Subrogation

Additional Insureds:
XYZ Landlord Property Management Co.
All subsidiaries, its officers,
directors and agents of each.

Workers Compensation
Statutory Limit
Bodily Injury - each accident $1,000,000
Bodily Injury - each disease $1,000,000
Bodily Injury - policy $1,000,000

Endorsements
Cancellation 30 days
Waiver of Subrogation

Certificate Holder
XYZ Landlord
555 Main Street
Santa Monica, CA 91140

FIG. 10

| Insured Type | What Information | Detail |
|---|---|---|
| Tenant | Square Footage | |
| | Occupancy Use | 1) Office<br>2) Restaurant<br>3) Retail<br>4) Light manufacturing<br>5) Warehouse<br>6) Industrial |
| | Business Description | |
| | Geographic Location (possibly) | |
| FUTURE DEVELOPMENT | | |
| Service Provider | Work Type (brief scope) | |
| | Contract Value | |
| Vendor | Product Type | |
| | Contract Value | May include percentage of sales |
| Contractor | Work Type (brief scope) | |
| | Contract Value | May include percentage of sales |

FIG. 11

SYSTEM AND METHOD FOR REQUESTING, RECEIVING, TRACKING AND VERIFYING OR RECEIVING PROOF OF INSURANCE COVERAGE AND TRANSFERRING RISK TO UNINSURED OR UNDERINSURED PARTIES

This application is a utility patent application that claims the benefits of U.S. Application Ser. No. 60/340,630, filed on Dec. 11, 2001, entitled SYSTEM AND METHOD FOR REQUESTING, RECEIVING, TACKING AND VERIFYING OR RECEIVING PROOF OF INSURANCE COVERAGE AND TRANSFERRING RISK TO UNINSURED OR UNDERINSURED PARTIES, which is hereby fully incorporated herein as though set forth in full.

BACKGROUND OF THE DISCLOSURE

1. Field of the Disclosure

This disclosure relates generally to shifting financial risks from one contracted party to another and, more specifically, relates to a system and method to monitor and track proof of insurance requirements and shifting the risk of inadequate insurance coverage to the appropriate party.

2. Brief Description of the Related Art

Currently, verifying insurance coverage is a complicated and labor intensive task. In a typical situation, an Indemnitee contracts with an Indemnitor and the contract between the parties includes provisions that require the Indemnitor to obtain and provide evidence of insurance coverage. The insurance coverage of the Indemnitor covers situations to reduce the Indemnitee's risk to potential lawsuits that could result from an incident related to the Indemnitor's responsibilities, work and/or negligent acts. In many instances, the contract requires the Indemnitor to purchase specific insurance, naming the Indemnitee as an additional insured and to indemnify and/or defend the Indemnitee against certain claims and losses from the Indemnitor's acts.

To ensure that the contractual insurance requirements are met, the contract typically requires the Indenmitor to provide proof of the required insurance. The Indemnitor typically provides proof of insurance to the Indemnitee by providing the Indemnitee with a certificate of insurance and copies of insurance policy endorsements. Typically the certificate of insurance is on a form provided by the Association for Cooperative Operations Research and Development (ACORD). The certificate of insurance is issued by the Indemnitor's insurance agent or broker and is then sent to the Indemnitee.

The certificate of insurance may include multiple types of insurance provided by multiple insurance policies, with each policy having its own policy number and expiration date. Oftentimes the Indemnitor may utilize different insurance agents for the various types of insurance they purchase. In this situation, the Indemnitee may receive more than one certificate of insurance as proof of insurance as required by the contract.

The task of tracking and monitoring compliance with the insurance provisions of a contract is typically completed manually. The Indemnitee requests the proof of insurance and tracks compliance with the contractual insurance requirements. In addition, each contract often has unique contractual insurance requirements including terms that are situation specific. Therefore, the unique contractual requirements create a logistical burden on the Indemnitee since the determination of contract compliance requires evaluating whether each certificate of insurance provides proof of insurance for each required type of insurance coverage. The verification typically includes: a) that limits match or exceed the contractual requirements for each insurance type; b) that the cancellation notification meets the contractual requirements; c) that the insurance policies are in force and have not expired; d) that any special requirements or extensions in coverage, or endorsement information, is included; e) that the insurance company providing the required insurance coverage meets the minimum financial rating, such as a certain A.M. Best rating; and f) that the Indemnitee, or other interested party, has been properly added to the insurance policy as an additional insured.

Manually collecting and verifying multiple certificates of insurance from each Indemnitor is a burdensome task. The process is labor intensive, costly and time-consuming. The process requires the drafting, tracking, and sending out of multiple letters with follow-up telephone calls. The burden increases greatly when the Indemnitee has a large number of contracts. Some companies do not have the resources required to conduct or properly complete the insurance verification process.

In addition, the terms of many contracts extend over multiple years, and insurance policies expire annually and most likely are not coterminous with the contract period. Therefore, requests must be made every year by the Indemnitee regarding the Indemnitor's insurance coverage in order to ensure ongoing compliance.

The most accurate way for the Indemnitee to verify insurance coverage of the Indemnitor is to request and receive copies of the relevant insurance policy endorsements from the issuing insurance carrier, since they are part of the policy. Policy endorsements, however, can be more difficult to obtain than certificates of insurance and require additional resources to track and review endorsements.

If an incident occurs, the Indemnitor and the Indemnitee, and possibly other interested parties, may be held legally liable for the damages associated with the incident. Examples of such an incident may include:

1. A visitor to a building injures himself when visiting a tenant. The visitor may bring an action against the tenant (Indemnitor) and the landlord (Indemnitee);

2. A family purchases an item that causes harm to a family member. The parents may bring an action against the store that sold the item (Indemnitee) and the item manufacturer (Indemnitor); and 3. A public works project has faulty workmanship and injures a pedestrian. The pedestrian may bring an action against the city (Indemnitee) and the general contractor (Indemnitor).

If the Indemnitor does not have the appropriate insurance coverage as required by the contract, the Indemnitee will not be able to transfer the exposure to the Indemnitor and may be held liable in a cause of action brought by the injured party. The Indemnitee then must attempt to recover its financial loss caused by the non-compliance of the Indemnitor by bringing a cause of action against the Indemnitor for damages.

The current method of enforcing insurance coverage of a party and transferring risk back to that party is too burdensome and costly and a need for a better method is present.

SUMMARY OF THE DISCLOSURE

The present disclosure is directed to a system and method for an Indemnitee to verify insurance coverage of an Indemnitor, including the steps of at least two parties entering into a contractual relationship that obligates the Indemnitor to indemnify the Indemnitee by maintaining contractually required insurance and to provide proof of the insurance, tracking the contractual insurance requirements and related pertinent information by either entering the information into a database or via another filing or tracking method, requesting on behalf of the Indemnitee proof of insurance from the Indemnitor, or the Indemnitee receiving the Indemnitor's insurance coverage information, comparing the Indemnitor's insurance coverage information with the contractual insurance requirements, and determining if the Indemnitor is in contractual compliance.

In another aspect of the disclosure, a system and method enables the Indemnitee to verify insurance coverage of an Indemnitor and further includes the Indemnitee or the Indemnitee's insurance agent or broker causing to issue or issuing insurance to protect the interests of the Indemnitee in the event the Indemnitor is not in contractual compliance.

In yet another aspect of the disclosure, disclosed is a system for an Indemnitee to verify insurance coverage of an Indemnitor and for shifting liability risk of an uninsured or underinsured Indemnitor from the Indemnitee to the Indemnitor by ensuring compliance through the tracking methods described above or by purchasing insurance for any covered claims that protects the Indemnitee in the event an Indemnitor is non-compliant, including a server system for executing system processes and communicating with at least one remote computer over a communication interface, the server system including a processor coupled to memory executing system processes. The processes including the steps of comparing the Indemnitor's insurance coverage information with contractual requirements and determining if the Indemnitor is in contractual compliance.

In another embodiment, disclosed is a computer readable medium with computer-executable instructions for performing a method including the steps of comparing the Indemnitor's insurance coverage information with the contractual requirements, and determining if the Indemnitor is in contractual compliance.

In another aspect of the disclosure disclosed is a method for an Indemnitee to verify insurance coverage of an Indemnitor, including the steps of at least two parties entering into a contractual relationship that obligates the Indemnitor to indemnify the Indemnitee by maintaining contractually required insurance and to provide proof of the insurance to the Indemnitee, the issuance of insurance to protect the Indemnitee in the event of any covered claim involving an uninsured or underinsured Indemnitor, summarizing and entering the insurance requirements and related pertinent information of an Indemnitor's contract into a database or other filing method, requesting on behalf of the Indemnitee proof of insurance from the Indemnitor, a service provider or the Indemnitee receiving the Indemnitor's insurance coverage information, comparing the Indemnitor's insurance coverage information with the contractual insurance requirements, determining if the Indemnitor is in contractual compliance, and the Indemnitee or the Indemnitee's insurance agent or broker causing to issue or issuing insurance to protect the interests of the Indemnitee in the event the Indemnitor is not in contractual compliance.

BRIEF DESCRIPTION OF THE DRAWINGS

The disclosure will now be described in greater detail with reference to the preferred embodiments illustrated in the accompanying drawings, in which like elements bear like reference numerals, and wherein:

FIG. 6 is a screen shot of the disclosed method illustrating contract insurance requirements of an Indemnitor;

FIG. 8 is a screen shot illustrating a billing detail of the Indemnitor;

FIG. 9 is a screen shot illustrating a notification to the Indemnitor that the Indemnitor is not in compliance with the required insurance requirements;

FIG. 10 is a screen shot illustrating an email to an agent broker to submit proof of insurance according to the required limits;

FIG. 11 is an illustration regarding forced placement of insurance when the Indemnitor is not in the insurance requirements.

DETAILED DESCRIPTION OF THE PREFERRED EMBODIMENTS

Figure 1:
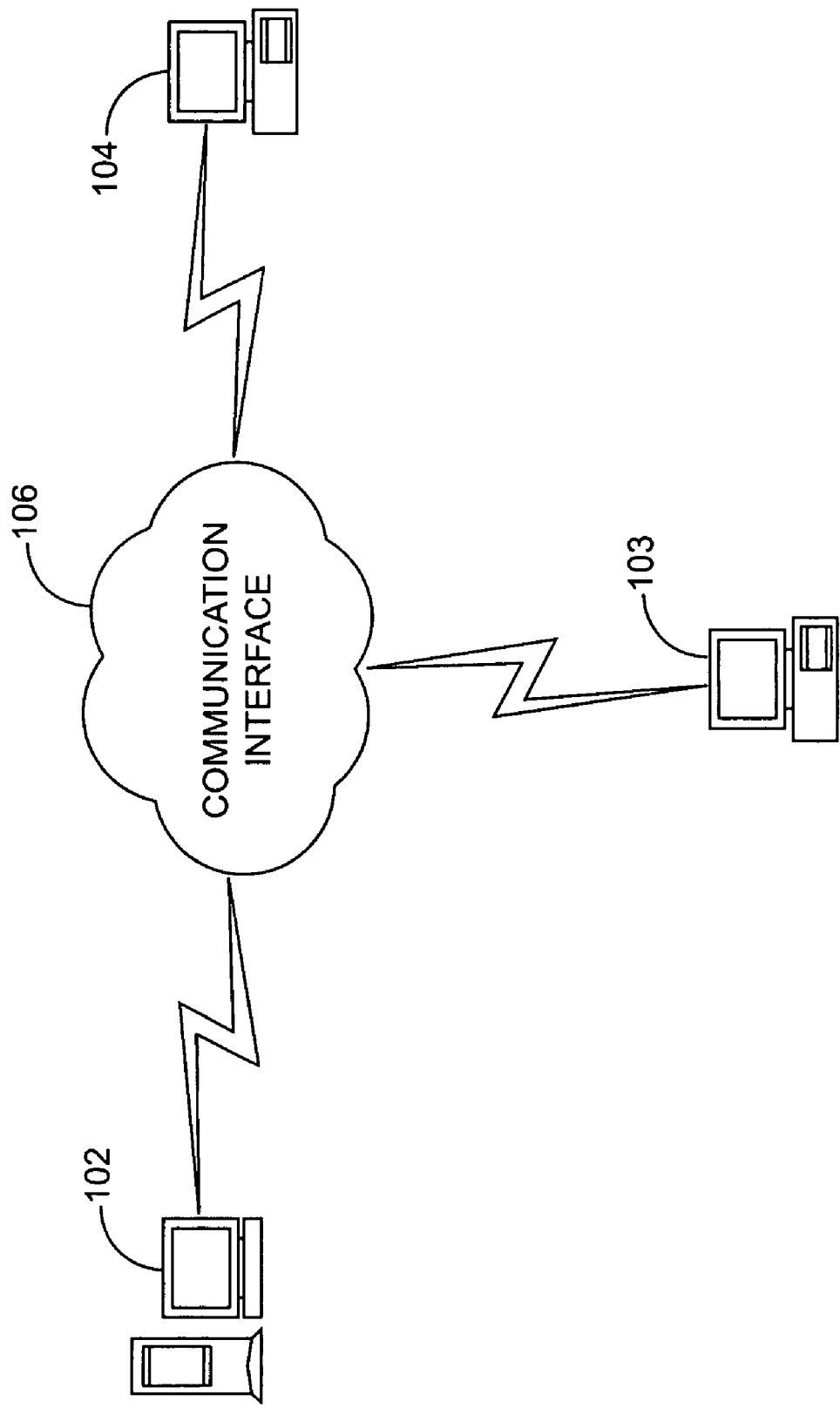
FIG. 1 is schematic representation illustrating a system and method for verifying or receiving proof of insurance coverage and shifting liability risk to an uninsured or underinsured Indemnitor according to the present disclosure.

FIG. 1 illustrates the operating environment or the overall system for the present disclosure. The operating environment disclosed could be used for the exchange of information and data, but it is particularly useful when Indemnitees desire to verify or confirm that an Indemnitor has particular insurance coverage as required in a contract that is in force involving the Indemnitee and the Indemnitor, or their agents. For this disclosure, an Indemnitee is a business that is generally considered the initiating or hiring party in a contract, and as part of the contract, requires proof from its contracted party ("Indemnitor") that the Indemnitor maintains the insurance as required by the contract to cover the indemnity and/or defense of the Indemnitee against certain potential losses. Examples of an Indemnitee include, but are not limited to, landlords, property managers, construction companies, retailers, franchisers, public entities, lessors, licensors, financial institution/lenders and any business that may require indemnification and/or defense against certain incidents that may occur related to any act or omission of its contracted party. For this document, an Indemnitor is a business that generally, with the exception of a landlord-tenant situation or licensee or licensor, is contracted to provide goods and/or services to an Indemnitee in exchange for money or is being provided a service by the Indemnitee (e.g. financing, leasing services, etc.), and are contractually obligated to provide Indemnitee with evidence that it maintains the insurance as required by the contract to cover the indemnity and/or defense of Indemnitee in the event of certain potential losses. Examples of Indemnitors include, but are not limited to, tenants, vendors, service providers, franchisees, manufacturers, general contractors, lessees, licensees, and sub-contractors.

The system includes remote computers 102, 103, and 104 that are electronically connected to a communication interface 106. The remote computers are, for example, used by the Indemnitee, the Indemnitor, and the Indemnitor's agent. Further, in the preferred embodiment, remote computer 102 is used by the Indemnitee. Remote computer 104 is used by the Indemnitor. And, remote computer 103 is used by the Indemnitor's insurance agent or insurance broker.

The remote computers 102, 103 and 104 may communicate via a service provider through the communication interface 106, or the Indemnitee may act as the service provider. The communication interface 106 allows for the sending and receiving of data by the remote computers and the server system. In one implementation, the communication interface 106 is the Internet. The Internet is a global network of computers referred to as servers which are accessible by remote computers, often referred to as "user nodes" or "client computers." These remote computers typically access the Internet through Internet Service Providers (ISPs), On-line Service Providers (OSPs), or direct Internet connections. Each computer on the Internet, referred to as a host, has at least one address that uniquely identifies it from all other computers on the Internet often referred to as an IP (Internet Protocol) address. The World Wide Web (WWW) is the graphical portion of the Internet that allows users to access information from web pages containing text, graphics, and multimedia elements through a web browser such as Netscape or Microsoft Internet Explorer.

In another implementation, the communication interface 106 is a wireless based system such as cellular based, digital cellular, GSM (Global System for Mobile communication), PCS (Personal Communications Services), PDC (Personal Digital Cellular), radio communications, satellite communications system, or other related system. In yet another implementation example, a Wireless Application Protocol (WAP) is utilized for sending and receiving data over the communication interface 106.

In another implementation, the communication interface 106 is a land-line based system such as a local area network (LAN), wide area network (WAN), ISDN (Integrated Services Digital Network), DSL (Digital Subscriber Line), xDSL (ADSL, HDSL, RADSL), Internet Cable, cable modem, PPP (Point-to-Point Protocol) connection, telephone lines, cables, fiberoptic cabling, or other related system. In another implementation example, the communication interface 106 is configured to communicate via TCP/IP (Transmission Control Protocol/Internet Protocol). In yet another implementation, EDI (Electronic Data Interchange) may be used as the communication interface 106.

In each implementation example, the remote computers 102, 103 and 104 allow users to send data to and receive data over the communication interface 106. Each remote computer 102, 103 and 104 is configured to have a processor coupled to memory for operation. The remote computer may be a personal computer, a laptop, a handheld computer, a PDA (Personal Digital Assistant), a server system, a workstation, a mobile phone, a wireless device, or other related devices containing a processor coupled to memory.

Figure 2:
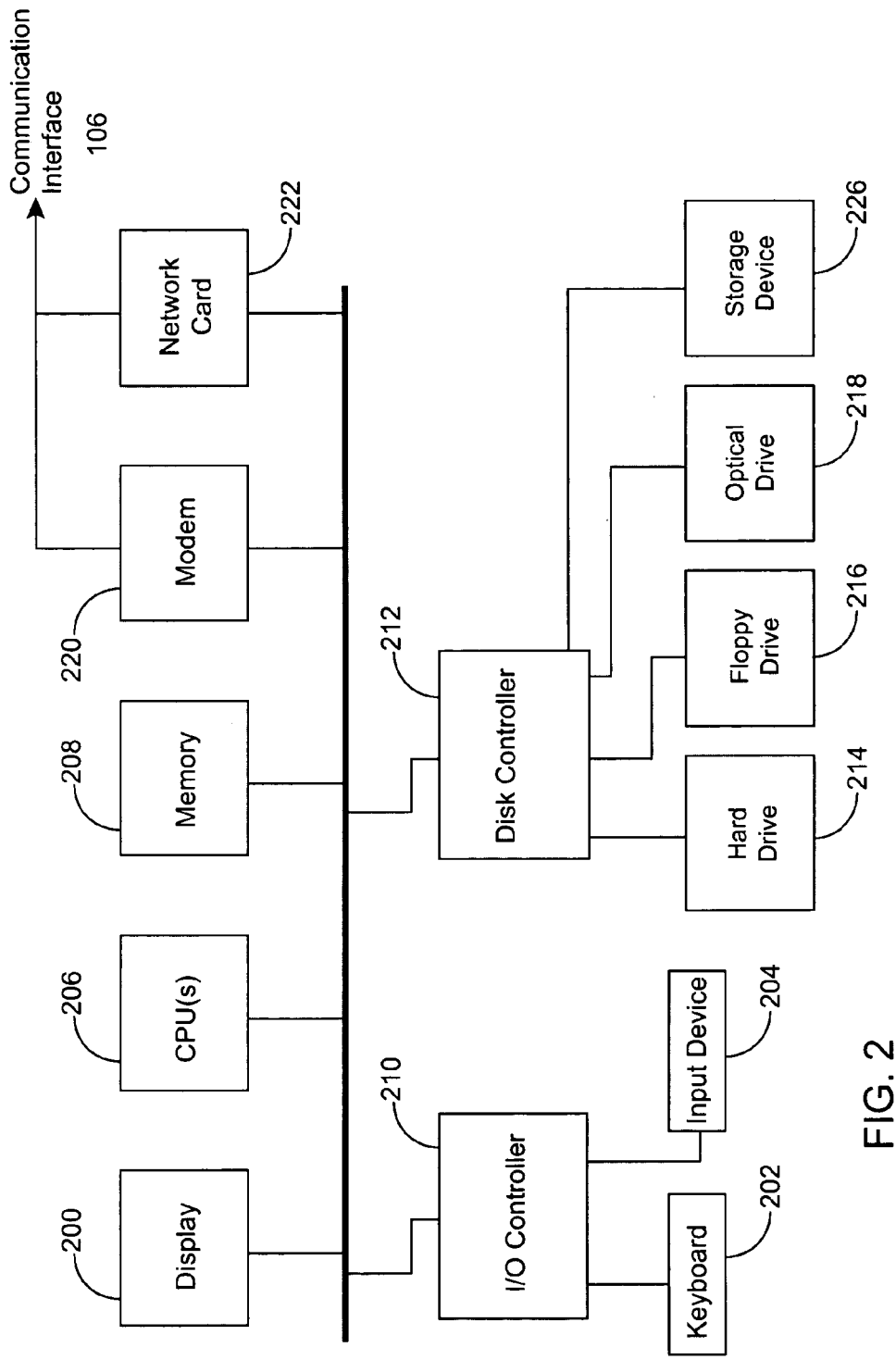
FIG. 2 is a block diagram illustrating an example of a service provider's or Indemnitee's computer system used to implement the present disclosure.

The server system will be operated by the Indemnitee, Indemnitor or a third party. The server system provides for executing system processes and communicating with remote computers over the communication interface 106. The server system is configured to have one or more servers along with peripheral components. The servers can be configured as a client/server, web server, mainframe, or a supercomputer. The server will generally be in the form of a computer as illustrated in FIG. 2. The server is not limited to these descriptions and may contain more or less computer components and/or peripheral components depending on system configuration.

In one implementation example, the server system is a web server, and the server system receives an http request from a remote computer over the communication interface 106. The server system responds to the request with an http response in the form of a web page. The remote computer receives the web page for further review and processing. The server system also includes software necessary for executing system processes, interfacing with the communication interface, and communicating with the remote computers as will be further discussed and illustrated in FIG. 3.

Generally, the remote computer will be configured as illustrated in FIG. 2. The computer includes a display 200, a keyboard 202, an input device 204, a central processing unit(s) 206, a memory 208, an I/O controller 210, a disk controller 212, a hard drive 214, a floppy drive 216, an optical drive 218, a modem 220, a network card 222, and a storage device 226. The storage device 226 can be configured as flash memory, a memory chip, tape storage, optical storage, or other processor readable medium. Each of the devices intercommunicate over bus 224 either directly or over their respective interfaces, controllers, or switches. The computer also includes an operating system, application software, communication software, and other system related software. The computer is not limited to these generally common devices or software since the computer will include other computer devices and/or software based upon the system configuration.

In an implementation example, a remote computer interfaces with the communication interface 106. The remote computer connects to the Internet by the modem 220, network card 222, or other communication means that allows interface between the remote computer and the Internet. If the network card 222 is used, it allows the computer to be connected to a LAN (local area network) or WAN (wide area network), which communicates with a HUB and router in making a connection to the Internet.

Figure 3:
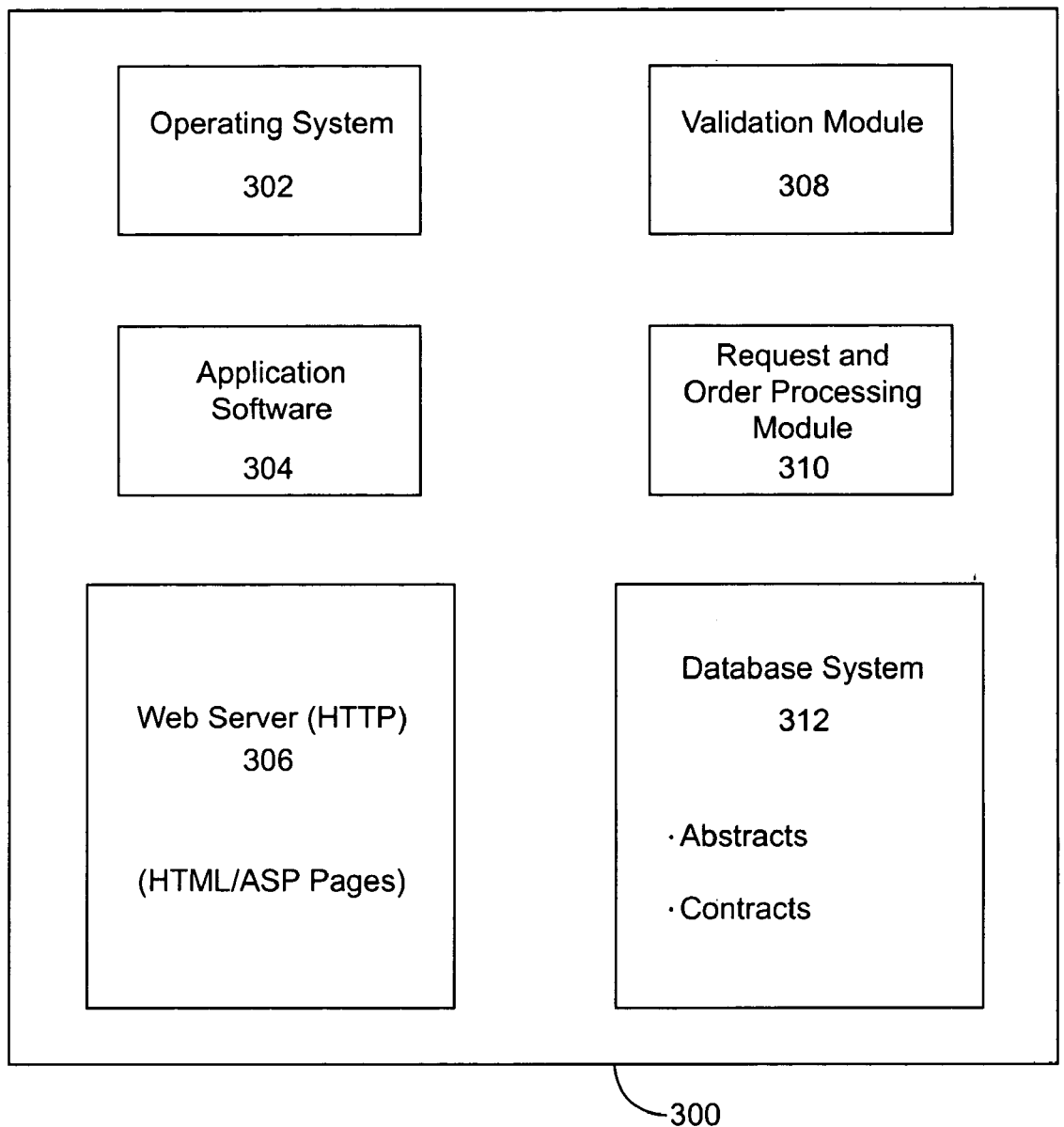
FIG. 3 is a block diagram illustrating an example of a system configuration used to implement the present disclosure.

FIG. 3 is a block diagram of an implementation example of the system configuration for a server system of service provider. The server system 300 includes an operating system 302, application software 304, web server (http server) 306, validation module 308, order processing module 310, and a database system 312. The operating system 302 must be compatible with the type of server system used, such as whether a client/server configuration or a mainframe configuration is used. The operating system controls all system operations and processing of requests to the server system for the software and/or hardware devices. The web server 306 is a program that runs on the server system that allows for processing requests from the World Wide Web and allows for responding to the requests in the form of web pages.

For example, contract information is abstracted into database system 312. The validation module 308 verifies the inquiry information against information contained in the database system 312 including an abstraction of the contractual requirements database, and other related databases. The validation module 308 by itself, or in combination with the order processing module 310, may retrieve verification information from other server systems or remote computers. Once the inquiry is validated, the order processing module 310 processes the inquiry by generating the inquiries to the Indemnitors. The order processing module 310 will issue a request of verification that the Indemnitor has the contractually required insurance, which will be sent by fax or email. The Indemnitor will forward the request for proof of insurance to their insurance agents or brokers' by either returning to the web server 306, confirming their own information, entering their insurance agents or brokers' information and forwarding the request via web server 306 to the insurance agents or brokers, or by forwarding the fax request directly to their insurance agents or brokers. The Indemnitor's insurance agents or brokers will enter the Indemnitor's insurance information into the database system 312 via the web server 306 or by faxing certificates of insurance and insurance policy endorsements to the Indemnitor or Indemnitor's service provider, which will then be abstracted into database system 312 via the web server 306. The order processing module 310 passes the inquiry information to the validation module 308 to verify elements of the inquiry including the parties, contractual requirements, insurance coverage requirements, and other related elements.

Figure 4:
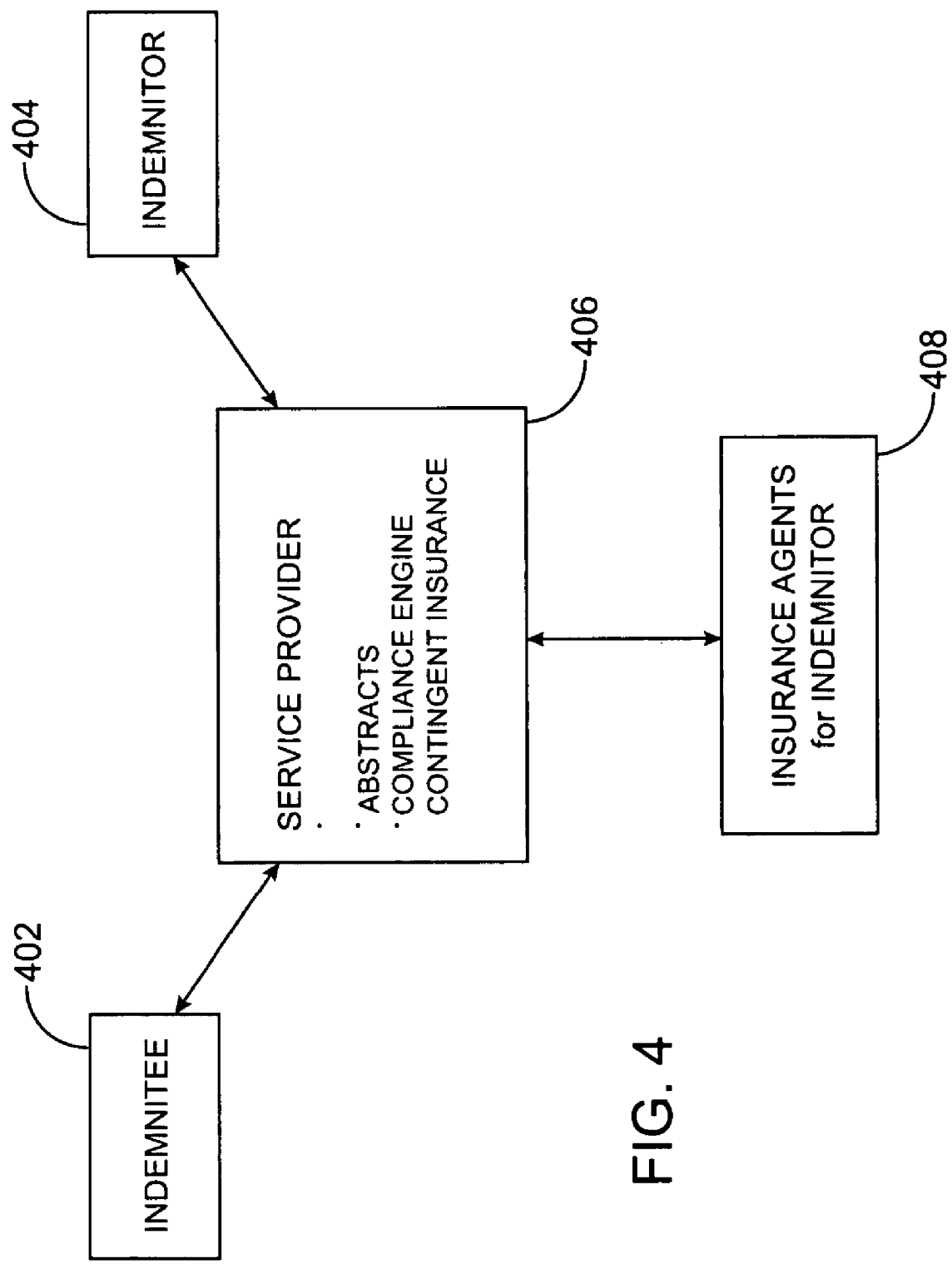
FIG. 4 is a schematic representation illustrating the relationships between a service provider, an indemnitee (service provider and indemnitee could in some cases be one in the same), an Indemnitor, and an insurance agent or broker for the Indemnitor.

FIG. 4 illustrates an overview illustrating the relationships between the Indemnitee, the Indemnitor, the service provider, which may be the Indemnitee, and the insurance agent for the Indemnitor according to the present disclosure. The Indemnitee 402, the Indemnitor 404, and the insurance agent 408 communicate directly with the service provider 406. When the Indemnitee makes an inquiry about the Indemnitor's insurance coverage, the inquiry is processed and forwarded through the service provider's system. The service provider's system includes several databases, such as the abstracts of the contractual requirements of each contract entered into between the Indemnitee and the Indemnitor. The service provider's system also includes a compliance engine. The compliance engine compares the Indemnitor's insurance coverage, as provided by the insurance agent 408, with the insurance coverage as required by the contract. The service provider's system also includes the information required to automatically order contingent insurance for the Indemnitor in the event that the Indemnitor is not in contractual compliance. The default insurance may be ordered through the Indemnitee or the Indemnitee's insurance broker.

Figure 5:
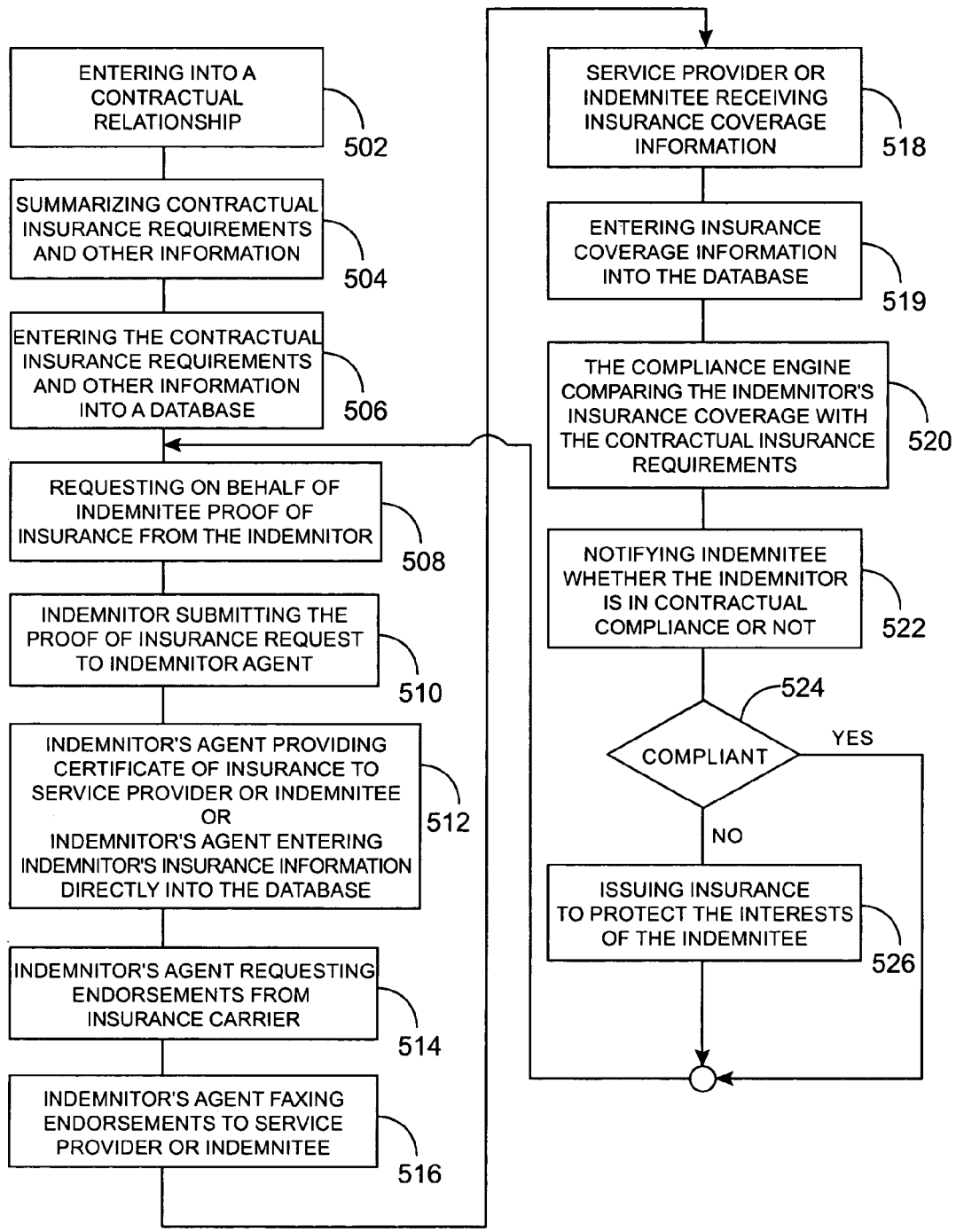
FIG. 5 is a flow chart illustrating an overview of the method according to the present disclosure.

FIG. 5 illustrates the process of the Indemnitee verifying insurance coverage of the Indemnitor. At step 502 the Indemnitee and the Indemnitor enter into a contractual relationship that requires the Indemnitor to carry insurance to protect the Indemnitee from covered claims. At step 504 the Indemnitee or a third party service provider summarizes the contractual insurance requirements and other pertinent information from the contract. At step 506 the summarized contract information including the insurance requirements is entered into a database. At step 508 the Indemnitee or a third party service provider requests on behalf of the Indemnitee proof of insurance coverage from the Indemnitor. At step 510 the Indemnitor submits the proof of insurance request to the Indemnitor's insurance agent or broker. At step 512 the Indemnitor's insurance agent or broker provides a certificate of insurance to the Indemnitee or to the service provider or enters the Indemnitor's insurance information directly into the database via a web server. At step 514 the Indemnitor's insurance agent or broker requests any required insurance endorsements from the Indemnitor's insurance carrier. At step 516 the Indemnitor's insurance agent or broker submits the received insurance endorsements to the Indemnitee or to the service provider. The endorsements may be submitted by faxing the endorsements to the indemnitee or to the service provider. At step 518 the service provider or the Indemnitee receives the Indemnitor's insurance coverage information at Step 519 the insurance coverage information is entered into a database. At step 520 the compliance engine compares the indemnitor's insurance coverage with the insurance requirements of the contract. At step 522 the compliance engine or the service provider notifies the Indemnitee whether the Indemnitor is in contractual compliance or not with regard to the Indemnitor's insurance coverage. If the Indemnitor is in contractual compliance, then as shown at step 524, the process returns to step 508, wherein the next inquiry will occur when the Indemnitor's insurance policy expires, renews or lapses or for any reason the Indemnitor's insurance becomes non-compliant, or if a new contract is formed between the Indemnitor and the Indemnitee. Nevertheless, if the Indemnitor is not in contractual compliance, then as shown at step 524, the process continues to step 526 where an insurance policy is issued to protect the interests of the Indemnitee in the event the Indemnitor is not in contractual compliance. This contingent insurance policy is issued to protect the Indemnitee from any covered claims involving an uninsured or underinsured Indemnitor. The contingent insurance may be issued by the Indemnitee's insurance agent, from the Indemnitor, or another party.

FIG. 6 illustrates a screen shot according to the present disclosure illustrating the contract's insurance requirements of an Indemnitor according to the present disclosure and how those entries are made by a user.

Figure 7:
FIG. 7 is a screen shot illustrating the compliance summary screen.

FIG. 7 illustrates a screen shot of a compliant summary page which illustrates the summary of the number of accounts of Indemnitors by a user and illustrating the number of insurance contracts that are currently under forced placement according to the present disclosure.

FIG. 8 illustrates a screen shot for a billing detail report that is an automated report to display all contracts that have been forcibly placed during a sample month with a forced placement rate.

FIG. 9 illustrates an in the text of an email or fax that is sent to a contracted party that is automatically triggered by the compliance report which is run daily when a non-compliance situation exists with an Indemnitor.

FIG. 10 illustrates a screen shot that is a request to an insurance agent or broker with a request to submit proof of insurance to the Indemnitee.

FIG. 11 is an illustration of forced placement and forced placement billing.

Figure 12:
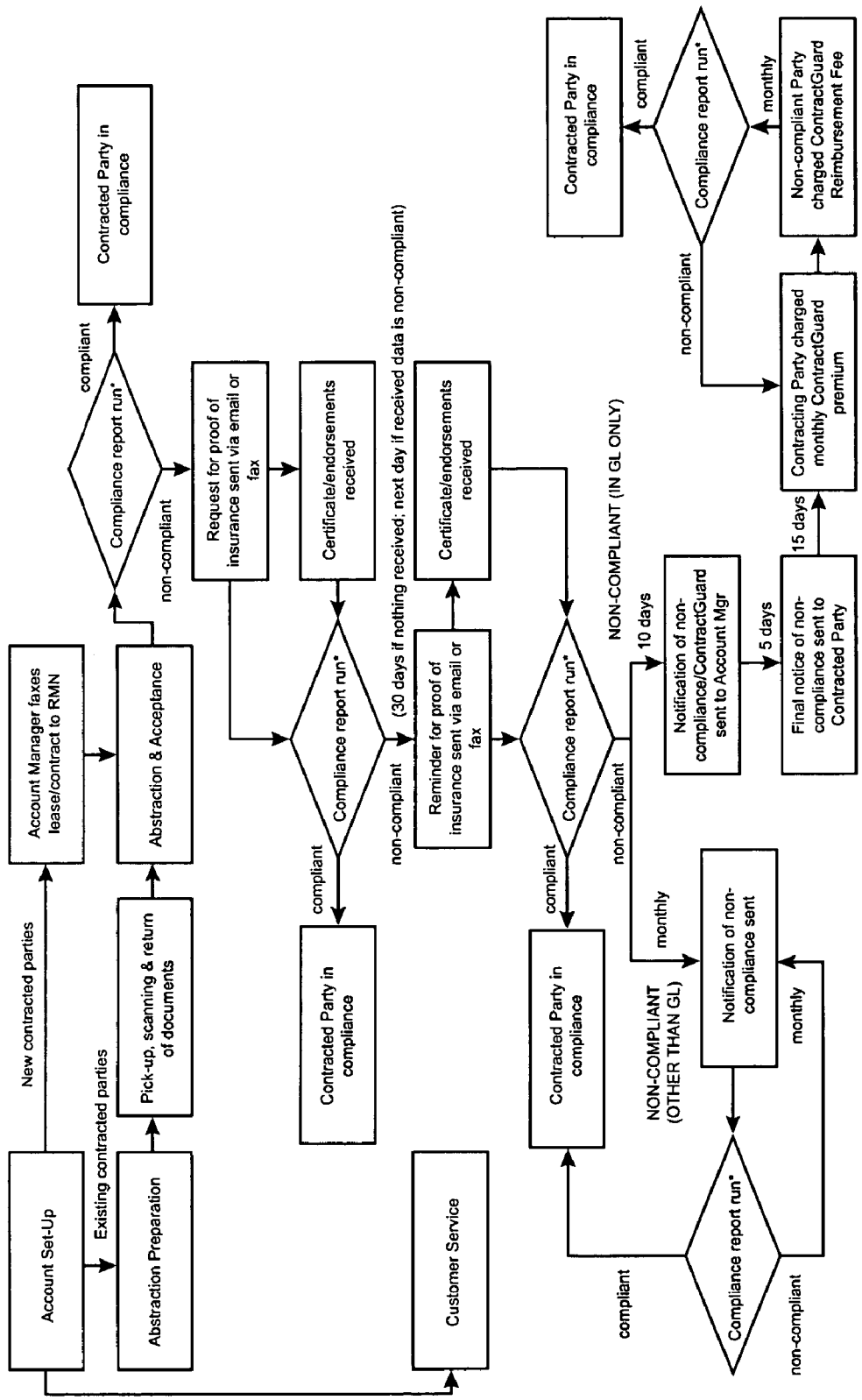
FIG. 12 is a detailed flow chart of the method according to the present disclosure.

FIG. 12 illustrates a detailed flow diagram illustrating a possible flow of the method according to the present disclosure.

Any of the above-disclosed methods may be tangibly embodied as a series of instructions stored on a processor readable medium. These instructions may exist independently, or they may be stored on a processor readable medium or memory. The medium may be part of the system including a processor configured to access the medium. Also, any of the methods may be tangibly embodied on a client or server. The electronic marketplace system as produced by any of the methods discussed may be embodied in the form of data or data structures. These data or data structures, as the case may be, may exist independently, or they may be stored in a memory or a computer readable medium including, without limitation, a hard disk, a floppy disk, RAM, ROM, EPROM, EEPROM, flash memory, volatile memory, read/write memory, CD-ROM, DVD, or any other related memory or computer readable medium.

Although this disclosure has been shown and described with respect to detailed embodiments, those skilled in the art will understand that various changes in form and detail may be made without departing from the scope of the claimed disclosure.

What is claimed is:

1. A method for an indemnitee to verify insurance coverage of an indemnitor, comprising the steps of:
   storing first data indicative of contractual insurance requirements and related pertinent information into a database, wherein the insurance requirements include at least one type of insurance and a minimum monetary level of protection for each type of insurance that the indemnitor is contractually required to maintain to indemnify the indemnitee;
   requesting on behalf of the indemnitee proof of insurance from the indemnitor;
   providing a server system comprising a server computer connected to memory that stores the database, the server system performing steps comprising:
      receiving second data indicative of the indemnitor's insurance coverage information;
      storing the second data in the database; storing third data indicative of verified insurance information for a plurality of insurance policies corresponding to a plurality of insurance providers into the database;
      comparing the indemnitor's insurance coverage information with the contractual insurance requirements;
      determining if the indemnitor is not in contractual compliance;
      upon determining that the indemnitor is not in contractual noncompliance, automatically notifying the indemnitor or an insurance agent of the indemnitor that the indemnitor is not in contractual compliance; and
      automatically causing issuance of a contingency insurance policy to bring the indemnitor into contractual compliance upon:
         a predetermined time period elapsing subsequent to the notifying step, and not receiving proof of the contractual compliance, wherein determining that the indemnitor is not in contractual noncompliance comprises determining that a current insurance policy of the indemnitor does not meet the minimum monetary level of protection for the at least one type of required insurance.

2. The method of claim 1, wherein the insurance requirements are reduced to a writing and the writing is summarized, and the server system further performs a step of storing fourth data indicative of the summarized writing into the database.

3. The method of claim 1, wherein the insurance is issued to protect the indemnitee in the event of uninsured or underinsured third-party liability claims.

4. The method of claim 2, wherein the server system further performs a step of storing information regarding a certificate of insurance or an insurance endorsement the database.

5. A computer readable medium, tangibly embodied with instructions which, when executed by a computer, perform the steps of:
   storing first data indicative of contractual insurance requirements and related pertinent information into a database wherein the insurance requirements include at least one type of insurance and a minimum monetary level of protection for each type of insurance that the indemnitor is contractually required to maintain to indemnify the indemnitee;
   requesting on behalf of the indemnitee proof of insurance from the indemnitor;
   receiving second data indicative of the indemnitor's insurance coverage information;
   storing the second data in the database;
   storing third data indicative of verified insurance information for a plurality, of insurance policies corresponding to a plurality of insurance providers into the database;
   comparing the indemnitor's insurance coverage information with the contractual insurance requirements;
   determining if the indemnitor is not in contractual compliance;
   upon determining that the indemnitor is not in contractual compliance automatically notifying the indemnitor or an insurance agent of the indemnitor that the indemnitor is not in contractual compliance; and
   automatically causing issuance of a contingency insurance policy to bring the indemnitor into contractual compliance upon:
      a predetermined time period elapsing subsequent to the notifying step and not receiving proof of contractual compliance wherein determining if the indemnitor is not in the contractual compliance comprises determining that a current insurance policy of the indemnitor does not meet the minimum monetary level of protection for the at least one type of required insurance.

6. The medium of claim 5 which is selected from the group comprising a disk, RAM, ROM, and VROM.

7. The medium of claim 5 which is selected from the group comprising a hard disk, floppy disk, flash memory, and a compact disk.

8. The method of claim 1, wherein the risk of non-coverage is shifted from the indemnitee to the indemnitor.

9. A system for an indemnitee to verify insurance coverage of an indemnitor and for shifting the risk of insurance non-coverage of the indemnitor from the indemnitee to the indemnitor, comprising:
   a server system for executing system processes and communicating with at least one remote computer over a communication interface, said server system including a processor coupled to memory storing a database, the processor executing system processes, said processes comprising:
      comparing the indemnitor's insurance coverage information with contractual requirements stored in the database, wherein the contractual requirements specify at least one type of insurance and a minimum monetary level of protection for each type of insurance that the indemnitor is contractually required to maintain to indemnify the indemnitee;
      receiving data indicative of insurance coverage of the indemnitee;
      storing the data indicative of the insurance coverage of the indemnitee;
      determining if the indemnitor is not in contractual compliance;
      upon determining that the indemnitor is not in contractual compliance, automatically notifying the indemnitor or an insurance agent of the indemnitor of that the indemnitor is not in contractual compliance; and
      automatically causing issuance of a contingency insurance policy to bring the indemnitor into contractual compliance upon:
         a predetermined time period elapsing subsequent to the notifying step, and not receiving proof of the contractual compliance, wherein determining if the indemnitor is in contractual compliance comprises determining that a current insurance policy of the indemnitor does not meeting the minimum monetary level of protection for the at least one type of required insurance.

10. The system of claim 9 wherein the communication interface is the Internet.

11. The system of claim 9 wherein the at least one remote computer is operated by at least one party, such as an indemnitor, an indemnitee, an insurance company, an insurance agent, an insurance broker, a landlord, a property manager, a franchiser, a franchisee, a public entity, a retailer, a tenant, a borrower, a lender, or a vendor.

12. The system of claim 9 wherein the memory is selected from the group comprising a hard disk, a floppy disk, RAM, ROM, EPROM, EEPROM, flash memory, volatile memory, read/write memory, CD-ROM, and DVD.

13. A computer readable medium, tangibly embodied with computer-executable instructions which, when executed by a computer, perform the steps of:
   storing first data indicative of contractual insurance requirements and related pertinent information into a database stored on the memory, wherein the insurance requirements include at least one type of insurance and a minimum monetary level of protection for each type of insurance that an indemnitor is contractually required to maintain to indemnify an indemnitee;
   comparing the indemnitor's insurance coverage information with the contractual insurance requirements; and determining if the indemnitor is not in contractual compliance;
   upon determining that the indemnitor is not in contractual compliance, automatically notifying the indemnitor or an insurance agent of the indemnitor that the indemnitor is not in contractual noncompliance; and
   automatically causing issuance of a contingency insurance policy to bring the indemnitor into contractual compliance upon:
      a predetermined time period elapsing subsequent to the notifying step, and not receiving proof of the contractual compliance, wherein determining that the indemnitor is not in contractual compliance comprises determining that a current insurance policy of the indemnitor does not meet the minimum monetary level of protection for the at least one type of required insurance.

14. The medium of claim 13 which is selected from the group comprising a hard disk, a floppy disk, flash memory, volatile memory, and read/write memory.

15. The medium of claim 13 which is selected from the group comprising a hard disk, a floppy disk, RAM, ROM, EPROM, EEPROM, flash memory, volatile memory, read/write memory, CD-ROM, and DVD.

16. The method of claim 1, wherein receiving the second data indicative of the indemnitor's insurance coverage information is performed subsequent to the indemnitor's agent entering the insurance policy information into the database or a system, or by faxing a certificate of insurance to the service provider or the indemnitee, which information is entered into the database or the system, or by faxing policy endorsements to the service provider or the indemnitee, which is entered into the database or the system.

17. The method of claim 1, wherein the database is part of a system and the system initiates new requests for proof of insurance when the indemnitor is determined to not be in contractual compliance.

18. The method of claim 1, wherein the database is part of a system and the system is capable of generating detailed reports, compliance reports, or management reports.

19. The method of claim 18, wherein the reports may be accessed by a remote computer.

20. The method of claim 1, wherein the at least one type of insurance is general liability insurance.

21. The method of claim 20, wherein the contingency insurance remains in force during the time insurance is required of the indemnitor.

22. The method of claim 20, wherein the insurance only protects the interests of the indemnitee or and/of the indemnitor or both.

23. The method of claim 1, wherein the indemnitee or indemnitor pays the premium for the insurance.

24. The method of claim 23, wherein the indemnitee seeks reimbursement from the indemnitor for the premium and any related expenses for the insurance or indemnitor pays directly the premium and any related expenses for the insurance.

25. The method of claim 1, wherein the server system further performs a step of storing data indicative of digital images of certificates or endorsements in the database.

26. A method for an indemnitee to verify insurance coverage of an indemnitor, comprising the steps of:
   at least two parties entering into a contractual relationship that obligates the indemnitor to indemnify the indemnitee by maintaining contractually required insurance and to provide proof of the insurance to the indemnitee, the insurance is to protect the indemnitee in the event of uninsured or underinsured third-party liability claims;
   summarizing contractual insurance requirements storing data indicative of the contractual insurance requirements information into a database, wherein the contractual insurance requirements include at least one type of insurance and a minimum monetary level of protection for each type of insurance that the indemnitor is contractually required to maintain to indemnify the indemnitee;
   requesting on behalf of the indemnitee proof of insurance from the indemnitor;
   providing a server system comprising a server computer coupled to a network and connected to memory that stores the database, the server system performing steps comprising:
   receiving second data indicative of the indemnitor's insurance coverage information;
   comparing the indemnitor's insurance coverage information with the contractual insurance requirements;
   determining if the indemnitor is not in contractual compliance;
   upon determining that the indemnitor is not in contractual noncompliance, automatically notifying the indemnitor or an insurance agent of the indemnitor via the network of that the indemnitor is not in contractual compliance; and
   automatically causing issuance of a contingency insurance policy to bring the indemnitor into contractual compliance upon:
      a predetermined time period elapsing subsequent to the notifying step and not receiving proof of the contractual compliance, wherein determining that the indemnitor is not in contractual compliance comprises determining that a current insurance policy of the indemnitor does not meet the minimum monetary level of protection for the at least one type of required insurance.

27. The method of claim 26, wherein receiving the second data indicative of the indemnitor's insurance coverage information is performed subsequent to the indemnitor's agent entering the insurance policy information into the database or a system, or by faxing a certificate of insurance to the service provider or the indemnitee, which information is entered into the database or the system, or by faxing policy endorsements to the service provider or the indemnitee, which is entered into the database or the system.

28. The method of claim 26, wherein the database is part of a system and the system initiates requests for proof of insurance when the indemnitor is determined to not be in contractual compliance.

* * * * *

UNITED STATES PATENT AND TRADEMARK OFFICE
CERTIFICATE OF CORRECTION

| | | |
|---|---|---|
| PATENT NO. | : 7,660,726 B2 | Page 1 of 1 |
| APPLICATION NO. | : 10/317645 | |
| DATED | : February 9, 2010 | |
| INVENTOR(S) | : McCaffrey et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Twenty-eighth Day of December, 2010

David J. Kappos
*Director of the United States Patent and Trademark Office*